United States Patent Office 2,708,662
Patented May 17, 1955

2,708,662

PRODUCTS FROM POLYCYCLIC PHENOLIC ETHERS AND METHODS

John B. Rust, Verona, and William B. Canfield, Montclair, N. J., assignors, by direct and mesne assignments, of one-half to Montclair Research Corporation, a corporation of New Jersey, and one-half to Ellis-Foster Company, a corporation of New Jersey No Drawing. Application July 13, 1951,
Serial No. 236,686

15 Claims. (Cl. 260—15)

This invention relates to unsaturated monohydric phenolic ether modified components, methods of making such components, compositions containing them and methods of making said compositions and is particularly concerned with the utilization of polycyclic phenolic ethers of unsaturated groups.

This application is a continuation-in-part of application No. 785,543 now Patent No. 2,563,871 granted August 14, 1951, and of application No. 785,545 now Patent No. 2,563,873 granted August 14, 1951.

Reaction products produced from polycyclic phenolic ethers of unsaturated radicals have been produced heretofore in the art but resulted in materials which could not be heated for any substantial length of time with drying oils without resulting in gelling or insolubilization in relatively short periods of time.

Among the objects of the present invention is the production of reaction products produced from phenolic ethers of unsaturated radicals which reaction products are capable of being heated for substantial periods of time to produce well reacted materials of relatively low acid number capable of wide utilization in a variety of products including coating compositions, molding compositions, etc.

Other objects and advantages of the present invention will appear from the more detailed description set forth below, it being understood that such more detailed description is given by way of illustration and explanation only, and not by way of limitation, since various changes therein may be made by those skilled in the art, without departing from the scope and spirit of the present invention.

In accordance with the present invention, compositions are produced containing reaction products of drying oil fatty acids material or natural water-insoluble gum material with polycyclic phenolic ethers containing at least two beta-unsaturated aliphatic radicals having from 3 to 4 carbon atoms, in an ether linkage. Other unsaturated radicals may be present either in ether groups such as allyloxy groups or as unsaturated groups e. g. allyl, directly attached to carbon in the phenolic nucleus.

A group of preferred phenolic ether derivatives are polyethers that may generally be formulated as (a)  $\quad$ P (OR)$_y$ where P is a polycarbocyclic polyvalent radical, R is a beta unsaturated aliphatic radical having from 3 to 4 carbon atoms and $y$ is the valence of the radical P and preferably from 2 to 3, or R in the above formulation may be the group —CH$_2$COOR′ where R′ is a beta-unsaturated aliphatic radical having from 3 to 4 carbon atoms. These unsaturated phenolic poly ethers are high-boiling, pale yellow liquids characterized by common grouping of an oxygen atom between an aromatic ring and a beta-unsaturated aliphatic group. They tend to set up to hard, brittle, resinous masses when heated at 150°–200° C. Such polymeric products may therefore be formed without the use of peroxides or acidic catalysts. When thickened to a syrup and baked in the form of thin films, hard brittle masses are formed which are exceedingly alkali-resistant. When these unsaturated phenolic compounds are polymerized by themselves in the presence of heat, characteristic red to dark brown color-bodies are formed which give rise to the production of characteristically dark products.

When the poly ethers are combined with non-conjugated drying oil fatty acid material including drying oils, drying oil fatty acids, and drying oil containing alkyd resins, reaction is fairly rapid and unexpectedly light-colored, highly viscous, color-stable products are obtained which when saponified are completely soluble in water. When the latter aqueous solution is acidified and the hydrolytic product washed and dried, the acids from these modified oils or oil acid-containing products show acid numbers of 100 to 160 depending upon the amount of unsaturated phenolic compound employed. These modified oils or oil-containing products may be converted by metallic driers, or a combination of metallic driers and heat, to insoluble infusible masses which possess surprisingly good resistance to the action of aqueous alkalies.

When these phenolic ethers are combined with natural water-insoluble gum material such as rosin, or esters of such gums, particularly polyhydric alcohol esters thereof, such as ester gum, or alkyd resins modified by such gums or esters, reaction is fairly rapid and unexpectedly light-colored, hard, brittle resins are obtained which when saponified are completely soluble in water. When the latter aqueous solutions are acidified and the hydrolytic product washed and dried, the acids from these modified rosin products possess acid numbers of 100–180 depending upon the amount of unsaturated phenolic compound employed. These modified rosin-containing esters are light-colored, hard, brittle resins of low acid numbers.

Reactions and reaction products made with the non-conjugated drying oil fatty acid material make it possible (1) To provide a modified drying oil composition of light color and low acid number which may be converted by metallic driers into hard, fast drying, infusible masses which are substantially resistant to the action of aqueous alkali solutions.

(2) To provide a modified drying oil or drying oil-containing alkyd resin of light color and low acid number which may be converted by metallic driers and heat into hard, non-yellowing insoluble films which have high resistance to the action of aqueous alkali solutions.

(3) To provide a modified drying oil which is fast bodying.

(4) To provide a modified drying oil which may be heated with rosin esters, phenolic resins, alkyd resins, natural resins, and the like to give rapid-drying coating compositions.

These results are attained by heating the unsaturated phenolic compound with unsaturated fatty acid radical-containing material, the latter being:

1. A non-conjugated drying oil (raw or bodied) or a polyhydric alcohol ester of non-conjugated drying oil acids other than the glycerol ester, 2. Non-conjugated drying oil acids, which may be individual unsaturated acids or the mixed acids resulting from saponifying a non-conjugated drying oil, 3. A non-conjugated drying oil-modified alkyd resin, 4. A stoichiometrical mixture of non-conjugated drying oil acids and polyhydric alcohol (e. g. glycerol, pentaerythritol, etc.) to form an ester during the heating process, or 5. A stoichiometrical mixture of non-conjugated drying oil acids, polyhydric alcohol and polycarboxylic acid (e. g., phthalic, succinic, adipic, sebacic, etc.) to form an alkyd resin during the heating process.

The non-conjugated drying oil material and the unsaturated phenolic compound are heated together in a suitable reactor at a temperature of 200°–300° C. until the reaction is substantially complete as shown by no more refluxing of the unsaturated phenolic compound. Heating is then continued until the reaction mixture reaches the desired viscosity. In general, a temperature of 260° C.–280° C. for 3 to 6 hours is sufficient to complete the reaction. In practice, an inert atmosphere of carbon dioxide or nitrogen may be employed to prevent an oxidation of the oil product, although its use is not essential. Neither is it necessary to employ the catalysts previously mentioned in the reaction, since combination takes place in the presence of heat as already described. Except where drying oil acids alone are reacted with the phenolic compound the resulting reaction products are clear and light-colored and have a very low acid number. The reaction products from drying oil acids and the phenolic compounds are acids which may be esterified or converted into salts, e. g., soaps, metallic driers, etc.

These products of this invention range from oils having a Gardner viscosity of C or D to hard, tough, resinous masses depending upon the formulation and the heat treatment of the product. They may be blended with cellulose esters such as nitrocellulose to give hard, tough, flexible air-drying coatings. They may also be used to modify rosin esters, phenolic resins, urea-formaldehyde resins, melamine-formaldehyde resins, and the like. They may also be combined with styrene, acrylic acid esters, methacrylic acid esters, acrylonitrile, and the like to obtain products useful to those skilled in the art. Such a combination with styrene, acrylic acid esters, methacrylic acid esters and the like may be secured in the following ways:

(a) Reaction between the modified oil and the vinyl type compound, followed by polymerization, and (b) Reaction between the unsaturated phenolic compound and vinyl type compound followed by reaction with the non-conjugated drying oil material.

In practicing the process of the present invention it is possible to employ as little as 1% or as much as 50% of the unsaturated phenolic product (based on the drying oil material); however, proportions of 5% to 30% are to be preferred, since this range of unsaturated phenolic compound imparts the desired degree of modification to the drying oil material.

There is no intention to limit the disclosure to any theoretical explanation of the reaction although it is probable that the reaction involved is one of addition. It is presumably an addition of the allyl groups (or other unsaturated hydrocarbon radicals) of the phenolic ether to the unsaturated fatty acid radicals, since drying properties and alkali resistance, as shown in the accompanying examples, appear to be superior where proportions of about one fatty acid radical to one beta-unsaturated alkyl group are employed.

As noted above it is possible to employ non-conjugated drying oil-modified alkyd resins in place of non-conjugated drying oils, or to employ a mixture of non-conjugated drying oil fatty acids, polyhydric alcohol, polycarboxylic acid and unsaturated phenolic ether (e. g., a mixture of linseed oil acids, pentaerythritol, phthalic anhydride and the methallyl ether of triallylphenol) the object, thereby, being to provide modified drying oil products having superior drying qualities and superior resistance to alkalies. Also, as noted above it is within the scope of the present invention to provide modified oil products wherein non-conjugated drying oil fatty acids, polyhydric alcohol, and unsaturated phenolic ether are reacted together simultaneously to provide an oil product having the properties heretofore disclosed.

Reactions and reaction products made with the natural water-insoluble gum material, e. g. rosin containing products are light-colored, hard, brittle resins which, in the case of rosin esters, for example, possess a low acid number. Thus it is possible (1) To provide a soluble, modified rosin-containing ester which will be heat advancing in drying oil varnish formulations.

(2) To provide a soluble, modified rosin-containing ester which upon cooking with drying oils such as linseed oil, soya bean oil, and the like will form fast drying, alkali resistant coatings.

(3) To provide a soluble, modified rosin-containing ester which will increase the speed of body and the subsequent speed of drying of the so-called slow drying oils such as linseed oil, soya bean oil, and the like.

(4) To provide a soluble, modified rosin-containing ester which, in combination with linseed oil, will be non-yellowing in baked coatings.

These objects are attained by heating the unsaturated phenolic compound with abietic acid radical-containing material including rosin, rosin ester (particularly a polyhydric alcohol ester), a rosin-modified alkyd resin, a mixture of rosin and a polyhydric alcohol (e. g., glycerol, pentaerythritol, etc.) in stoichiometrical proportions to form a rosin ester, and a mixture of rosin, a polyhydric alcohol and a polycarboxylic acid (e. g., phthalic, succinic, adipic, sebacic, etc.) in stoichiometrical proportions to form a rosin-modified alkyd resin. The rosin material and the unsaturated phenolic compound are heated together in a suitable reactor at a temperature of 200° to 300° C. until the reaction is substantially complete as shown by no more refluxing of the unsaturated phenolic compound. Heating is then continued until the reaction product reaches the desired hardness. In practice, an inert atmosphere of carbon dioxide or nitrogen may be employed to prevent any oxidation of the resin, although its use is not essential. Neither is it necessary to employ a catalyst in the reaction, since combination takes place in the presence of heat alone as already described. The resulting resins are clear, hard and brittle, and exceedingly pale in color. The resins prepared from rosin esters or rosin ester-forming mixtures possess acid numbers of 2 to 20.

The products of the present invention may be blended with nitrocellulose esters to form nitrocellulose lacquers which show a surprisingly rapid rate of solvent release. These resins when modified with drying oils, particularly the so-called soft drying oils such as linseed oil or soya bean oil, provide exceedingly fast drying coating compositions which possess an excellent resistance to dilute aqueous alkali. They may also be combined with styrene, acrylic acid esters, methacrylic acid esters, acrylonitrile, and the like to obtain products useful to those skilled in the art.

In practicing the process of the present invention as little as 1% and as much as 50% of the unsaturated phenolic product (based on the rosin or rosin ester) may be employed. However, proportions of 10% to 30% of the unsaturated phenolic compound are to be preferred, since these proportions impart the desired degree of modification to the rosin or rosin esters. The higher proportions of the unsaturated phenolic compound give resins which possess higher softening points and impart a better alkali resistance to the varnish formulations in which the resins are employed.

There is no intention to limit the invention to any theoretical explanation of the reaction, although it is probable that it involves addition. It is presumably an addition of the unsaturated allyl groups (or other unsaturated hydrocarbon groups) of the phenolic ether to the unsaturated acid radicals of the rosin, since initially the resins prepared from rosin and the unsaturated phenolic ether are completely alkali-soluble.

It is possible to employ dicarboxylic acid-modified rosin esters in place of rosin or the polyhydric alcohol-rosin esters. Also, as noted above it is within the scope of the present invention to provide modified rosin esters wherein rosin, polyhydric alcohol, and unsaturated phenolic product, or rosin, polyhydric alcohol, polycarboxylic acid and the unsaturated phenolic compound, are reacted together simultaneously.

There are numerous phenolic mono ethers as formulated above. For the purposes of exemplification, these include unsaturated poly ethers of polycyclic phenols of the type:

as formulated above there is a beta unsaturated aliphatic radical such as allyl, methallyl, crotyl, or butenyl. The ethers are prepared in known manner by treating the phenols with the appropriate unsaturated alkyl halide such as allyl chloride, methallyl chloride, 3-chlorobutene-1, or crotyl bromide.

While many of the examples herein teach the use of linseed oil, other non-conjugated drying oils and drying oil acids such as soya bean oil, cottonseed oil, perilla oil, corn oil, sunflower seed oil and the like may be employed and are to be considered within the scope of the present invention. Also, although the examples illustrate only allyl compounds, it is to be understood that methallyl and crotyl derivatives are suitable as well as compounds having mixed unsaturated aliphatic radicals.

There are numerous phenolic poly ethers as formulated above that may be utilized. The ethers are made in known manner by reacting the above polyhydric phenols with an unsaturated halide such as allyl chloride or bromide, methallyl chloride, 3-chlorobutene or crotyl chloride.

While many of the examples herein teach the use of the rosin ester of glycerol (ester gum), it is apparent that rosin ester such as pentaerythrityltetraabietate, mannityl abietate, and the like may also be used. Within this classification may also be considered such natural gums as copal, gum elemi, sandarac, thus, and the like, since these also undergo the reactions herein described.

Further, mixtures of polyethers of the types herein set forth may be reacted with the non-conjugated drying oil fatty acid material or with the natural gum material or with mixtures of the non-conjugated drying oil acid material and gum material. Or mixtures of non-conjugated drying oil acid material with natural resin material may be reacted with the poly ethers or the mixtures of them, herein set forth, under the conditions of the examples.

The following examples will illustrate the invention, parts being by weight unless otherwise indicated.

*Example 1.*—100 parts of glyceryl triabietate (ester gum) and 25 parts of the diallyl ether of diphenylolpropane are heated together in a 500 ml., 3-neck flask equipped with a thermometer, stirrer, and air-condenser. Heating is carried out at 250°–260° C. for 6 hours. A light-colored, hard, brittle resin is obtained having a ring and ball softening point of 108° C.

50 parts of the above resin and 80 parts of Z–2 bodied linseed oil are heated together to 280° C. in ½ hour. Heating is thereafter continued at 280°–290° C. for 90 minutes. The resulting varnish base is thinned to 50% solids with V. M. and P. naphtha. The varnish possesses a Gardner viscosity of F. To the above varnish is added 0.5% lead as lead naphthenate and 0.075% cobalt as cobalt naphthenate based upon the oil content of the varnish. The varnish air-dries to a non-tacky film in 4¼ hours. After 24 hours the air-dried film possesses a Sward Rocker hardness of 53.

*Example 2.*—100 parts of glyceryl triabietate (ester gum) and 40 parts of the diallyl ether of diphenylolpropane are heated together in a 500 ml., 3-neck flask equipped with a thermometer, stirrer and air-condenser. Heating is carried out at 260°–270° C. for 4¾ hours. A light-colored, hard resin is secured, having a ring and ball softening point of 102° C.

50 parts of the above resin and 80 parts of Z–2 bodied linseed oil are heated together to 380° C. in ½ hour. Heating is thereafter continued at 280°–290° C. for 55 minutes. The resulting varnish base is thinned to 50% solids with V. M. and P. naphtha. The varnish has a Gardner viscosity of F–G. To the above varnish is added 0.5% lead as lead naphthenate and 0.075% cobalt as cobalt naphthenate based upon the oil content of the varnish. The varnish air-dries to a tack-free film in 3¾ hours. After 24 hours the air-dried film possesses a Sward Rocker hardness of 61.

*Example 3.*—50 parts of rosin, 10 parts of commercial pentaerythritol, 10 parts of phthalic anhydride, and 12 parts of the diallyl ether of diphenylolpropane are heated together in a 500 ml., 3-neck flask provided with a stirrer, thermometer, and water-trap connected to a water-cooled condenser. Heating is carried out at 200°–240° C. for 8 hours, while collecting 4.2 parts of distillate in the water-trap. A hard, light-colored resin is secured which possesses an acid number of 17.3 and a ring and ball softening point of 87° C.

*Example 4.*—100 parts of glyceryl triabietate (ester gum) and 10 parts of the diallyl ester of diphenylolpropane diacetic acid are heated together in a 500 ml., 3-neck flask equipped with a thermometer, stirrer, and air-condenser. Heating is carried out at 240° C.–250° C. for 6½ hours. A light-colored clear resin is secured which possesses a ring and ball softening point of 107° C.

*Example 5.*—100 parts of glyceryl triabietate (ester gum) and 25 parts of the diallyl ester of diphenylolpropane diacetic acid (diallyl isopropylidene-bis-phenoxyacetate) are heated together in a 500 ml., 3-neck flask equipped with a thermometer, stirrer, and air-condenser. Heating is carried out at 250°–260° C. for 8 hours. A light-colored, brittle resin is obtained having a ring and ball softening point of 112° C.

50 parts of the above resin and 80 parts of Z–2 bodied linseed oil are heated together to 280° C. in ½ hour. Heating is continued at 280°–290° C. for 35 minutes. The resulting varnish base is thinned to 50% solids. 0.5% lead and 0.075% cobalt dries as naphthenates based upon the oil content of the varnish is added. The resulting varnish air-dries to a tack-free film in 4¼ hours. After 24 hours, the dried varnish film possesses a Sward Rocker hardness of 67.

*Example 6.*—50 parts of pentaerythritol abietate and 5 parts of the diallyl ester of resorcinol diacetic acid are heated together in a 500 ml., 3-neck flask equipped with a thermometer, stirrer, and air-condenser. Heating is carried out at 240°–250° C. for 5½ hours. A light-colored, brittle resin is secured having a ring and ball softening point of 102° C.

*Example 7.*—50 parts of a rosin modified phthalic glyceride of acid number 15 and 10 parts of the diallyl ether of diphenylol propane are heated together in a 500 ml., 3-neck flask equipped with a stirrer, thermometer, and water-cooled condenser to 200° C. in one hour. Thereafter heating is continued at 240°–250° C. for 6½ hours. A light-colored, hard, brittle resin is secured which possesses a ring-and-ball softening point of 79° C.

It will be understood that it is intended to cover all changes and modifications of the examples of the invention herein chosen for the purpose of illustration which do not constitute departures from the spirit and scope of the invention.

*Example 8.*—150 parts of raw linseed oil and 25 parts of the diallyl ether of diphenylolpropane are heated together in a one-liter, 3-neck flask equipped with a thermometer, stirrer and water-cooled condenser to 250° C. Heating is thereafter continued at 260°–280° C. for 4½ hours. A light-colored, clear oil is secured which possesses a Gardner viscosity of E and an acid number of 7.

A film of the oil containing 0.6% lead and 0.06% cobalt as naphthenates air-dries to a hard, non-tacky film in 24 hours.

50 parts of ester gum and 80 parts of the above oil are heated together to 280° C. in ½ hour. Heating is thereafter continued at 280°–290° C. for 70 minutes.

The resulting light-colored varnish base may be drawn into a string 24 inches in length. It is thinned with V. M. and P. naphtha to 50% solids. The varnish has a Gardner viscosity of D to E.

To 50 parts of the above varnish is added 0.015% cobalt as cobalt naphthenate based upon the oil content of the varnish. A film of the varnish is baked for 1 hour at 120 C. The baked film is non-yellowing and possesses a Sward Rocker hardness of 39. The baked film of the varnish turns cloudy in 1% aqueous alkali after being immersed for 45 minutes.

To 50 parts of the above varnish is added 0.6% lead and 0.06% cobalt as naphthenates based upon the oil content of the varnish. The varnish air-dries to a tack-free film in 3½ hours. The dried film possesses a Sward Rocker hardness of 45 after 24 hours and 59 after 96 hours.

*Example 9.*—150 parts of raw linseed oil and 42.5 parts of the diallyl ether of diphenylolpropane are heated together to 250° C. in a one-liter, 3-neck flask equipped with a thermometer, stirrer and water-cooled condenser. The resulting clear reaction mixture is finally heated at 260°–270° C. for 4¼ hours. A light-colored clear oil is secured having a Gardner viscosity of G and an acid number of 9.0.

A film of oil containing 0.6% lead and 0.06% cobalt as naphthenates air-dries to a hard, non-tacky film in 24 hours.

50 parts of ester gum and 80 parts of the above oil are heated together to 280° C. in ½ hour. Heating is thereafter continued at 260°–290° C. for 40 minutes. The resulting light-colored varnish base may be drawn into a string 24 inches in length. It is thinned with V. M. and P. naphtha to 50% solids. The varnish possesses a Gardner viscosity of F.

To 50 parts of the above varnish is added 0.015% cobalt as cobalt naphthenate based upon the oil content of the varnish. A film of the varnish is baked for 1 hour at 120° C. The baked film is non-yellowing and possesses a Sward Rocker hardness of 49. The baked film of the varnish turns cloudy in 1% aqueous alkali after being immersed for 120 minutes.

To 50 parts of the above varnish is added 0.6% lead and 0.06% cobalt as naphthenates based upon the oil content of the varnish. The varnish air-dries to a tack-free film in 3 hours. The dried film possesses a Sward Rocker hardness of 47 after 24 hours and 55 after 96 hours.

*Example 10.*—150 parts of raw linseed oil and 80 parts of the diallyl ether of diphenylolpropane are heated together to 250° C. in a one-liter, 3-neck flask equipped with a thermometer, stirrer and water-cooled condenser. The resulting clear reaction mixture is finally heated at 250°–260° C. for 4 hours to give a light-colored clear oil having a Gardner viscosity of H and an acid number of 10.4.

A film of the oil containing 0.6% lead and 0.06% cobalt as naphthenates air-dries to a hard non-tacky film in 24 hours.

50 parts of ester gum and 80 parts of the above oil are heated together to 280° C. in ½ hour. Heating is continued at 280°–290° C. for 30 minutes. The resulting light-colored varnish base may be drawn into a string 24 inches in length. It is thinned with V. M. and P. naphtha to 50% solids to give a varnish of Gardner viscosity G.

To 50 parts of the above varnish is added 0.015% cobalt as cobalt naphthenate based upon the oil content of the varnish. A film of the varnish, baked for 1 hour at 120° C. is non-yellowing and of Sward Rocker hardness 55. The baked film of the varnish turns cloudy in 1% aqueous alkali after being immersed for 180 minutes.

To 50 parts of the above varnish is added 0.6% lead and 0.06% cobalt based upon the oil content of the varnish. The varnish air-dries to a tack-free film in 3 hours. The dried film possesses a Sward Rocker hardness of 49 after 24 hours and 59 after 96 hours.

*Example 11.*—150 parts of raw linseed oil and 22.5 parts of the diallyl ester of resorcinol diacetic acid (diallyl m-phenyleneoxyacetate) are heated together in a one-liter, 3-neck flask equipped with a thermometer, stirrer and water-cooled condenser to 250° C. Heating is thereafter continued at 250°–260° C. for 6 hours. A light-colored, extremely viscous oil results. Acid number 8.6.

A film of the oil containing 0.6% lead and 0.06% cobalt as naphthenates air-dries to a tack-free hard coating in 24 hours.

50 parts of ester gum and 80 parts of the above oil are heated together to 280° C. in ½ hour. Heating is thereafter continued at 280°–290° C. for 57 minutes. The resulting varnish base may be drawn into a string 24 inches in length. The light-colored varnish base is thinned to 50% solids with V. M. and P. naphtha giving a varnish of Gardner viscosity F.

To 50 parts of the above varnish is added 0.015% cobalt as cobalt naphthenate based upon the oil content of the varnish. A film of the varnish baked for one hour at 120° C. is non-yellowing. It has a Sward Rocker hardness of 57 and turns white in 1% aqueous alkali after 1½ hours of immersion.

To 50 parts of the above varnish is added 0.6% lead and 0.06% cobalt as naphthenates based upon the oil content of the varnish. The varnish air-dries to a tack-free film in 4 hours. The dried film possesses a Sward hardness of 55 after 24 hours and 59 after 96 hours.

*Example 12.*—150 parts of raw linseed oil and 22.5 parts of the diallyl ester of the diacetic acid derivative of diphenylolpropane (diallyl isopropylidene-bis phenoxyacetate) are heated together in a one-liter, 3-neck flask equipped with a thermometer, stirrer and water-cooled condenser to 250° C. Heating is thereafter continued at 250°–260° C. for 5 hours. A light-colored, extremely viscous oil is secured. Acid number 7.9.

A film of the oil containing 0.6% lead and 0.06% cobalt as naphthenates air-dries to a hard tack-free film coating in 24 hours.

50 parts of ester gum and 80 parts of the oil of Example 9 are heated together to 280° C. in ½ hour. Heating is thereafter continued at 280°–290° C. for 38 minutes. The resulting varnish base can be drawn into a string 24 inches in length. The light-colored varnish base when thinned to 50% solids with V. M. and P. naphtha has a Gardner viscosity of F.

To 50 parts of the above varnish is added 0.015% cobalt as cobalt naphthenate based upon the oil content of the varnish. A film of the varnish baked for one hour at 120° C. is non-yellowing. It possesses a Sward Rocker hardness of 61 and turns cloudy in 1% aqueous alkali after 1¼ hours of immersion.

To 50 parts of the above varnish is added 0.6% lead and 0.06% cobalt as naphthenates based upon the oil content of the varnish. The varnish air-dries to a tack-free film in 3½ hours. The dried film shows a Sward hardness of 57 after 24 hours and 59 after 96 hours.

The ester gum varnishes from the oil examples were carefully compared with a like varnish from ester gum and bodied linseed oil ("Alinco" Z–2).

50 parts of ester gum and 80 parts of bodied linseed oil are heated together to 280° C. in ½ hour. The resulting varnish base is then heated further at 280°–290° C. for 110 minutes and may be drawn into a string 24 inches in length. The varnish base, thinned to 50% solids with V. M. and P. naphtha, possesses a Gardner viscosity of D. To 50 parts of the above varnish is added 0.015% cobalt as cobalt naphthenate based upon the oil content of the varnish. A film of the varnish when baked for one hour at 120° C. is decidedly darkened. It possesses a Sward Rocker hardness of 24 and turns white in 1% aqueous alkali after 15 minutes of immersion. To 50 parts of the above varnish is added 0.6% lead and 0.06% cobalt as naphthenates air-dries to a tack-free film in 7½ hours. The dried film shows a Sward hardness of 27 after 24 hours and 47 after 96 hours.

The following table is presented to show differences between varnishes prepared from bodied linseed oil and the varnishes prepared from the oils disclosed in certain of the above examples.

*Varnishes*

|  | "Alinco" Z-2 | 1 | 2 | 3 | 8 | 9 |
|---|---|---|---|---|---|---|
| Cooking time at 280°–290° C. (min.). | 110 | 70 | 40 | 30 | 57 | 38. |
| Gardner viscosity (50% solids). | D | D–E | F | G | F | F. |
| Drying time (Tack Free) | 7½ hrs | 3½ hrs | 3 hrs | 3 hrs | 4 hrs | 3½ hrs. |
| Sward Hardness (24 hours) | 27 | 45 | 47 | 49 | 55 | 57. |
| Sward Hardness (96 hours) | 47 | 59 | 55 | 59 | 59 | 59. |
| Baked Varnishes: |  |  |  |  |  |  |
| Color of baked film | yellowed | non-yellowing | non-yellowing | non-yellowing | non-yellowing | non-yellowing |
| Sward Hardness | 24 | 39 | 49 | 55 | 57 | 61. |
| Resistance to 1% aqueous alkali. | white in 15 min. | white in 45 min. | white in 120 min. | white in 180 min. | white in 90 min. | white in 75 min. |

*Example 13.*—21 parts of phthalic anhydride, 29 parts of glycerol, 125.1 parts of soya bean oil acids, and 30 parts of the diallyl ether of diphenylolpropane are placed in a 500 ml., 3-neck flask equipped with a thermometer, stirrer and a water-trap attached directly to a water-cooled condenser. Heating is carried out at 200°–210° C. for 6 hours.

16.2 parts of distillate are collected in the water-trap. A light-colored, hard product having an acid number of 12.2 is obtained. The modified alkyd resin is dissolved in xylol to form a clear solution of 50% solids. 0.6% lead and 0.06% cobalt as naphthenates based upon the soya bean oil acids content of the resin are added. The resin solution air-dries to a non-tacky film in 5¼ hours.

*Example 14.*—One hundred parts of a drying oil alkyd resin of acid number 30 (formed by heating a mixture of 148 parts phthalic anhydride, 80 parts of glycerol, 140 parts of linseed oil acids and 150 parts of linseed oil) and 20 parts of the diallyl ester of diphenylolpropane diacetic acid are heated together in a 500 ml., 3-neck flask equipped with a thermometer, stirrer, and water-cooled condenser to 200° C. in one hour. Heating is thereafter continued at 210°–220° C. for 5¼ hours. An exceedingly viscous resinous product is formed.

25 parts of this resin and 25 parts of xylol are warmed together to form a clear solution. A film of the xylol solution baked at 120° C. for one hour is hard and tough. The baked film spotted in 1% aqueous alkali after immersion for 2¼ hours.

It will be understood that it is intended to cover all changes and modifications of the examples of the invention herein chosen for the purpose of illustration which do not constitute departures from the spirit and scope of the invention.

Having thus set forth our invention, we claim:

1. A composition comprising a low acid number, soluble heat reaction product at between 200° and 300° C. of (a) material selected from the group consisting of non-conjugated drying oil fatty acids, polyhydric alcohol esters thereof, a natural water-insoluble gum, polyhydric alcohol esters of said gum, and alkyd resins modified by said gum, and mixtures thereof, and (b) a polycyclic phenolic poly ether containing from 2 to 3 beta-unsaturated aliphatic radicals having from 3 to 4 carbon atoms attached directly through oxygen to the polycycle.

2. A composition comprising a low acid number soluble heat reaction product at between 200° and 300° C. of non-conjugated drying oil fatty acid material and a polycyclic phenolic poly ether containing from 2 to 3 beta-unsaturated aliphatic radicals having from 3 to 4 carbon atoms attached directly through oxygen to the polycycle.

3. A composition as in claim 2 in which the oil material is linseed oil and the poly ether is diallyl ether of diphenylolpropane.

4. A composition as in claim 2 in which the oil material is soya bean phthalic glyceride and the polyether is diallylether of diphenylolpropane.

5. A composition comprising a low acid number soluble heat reaction product at between 200° and 300° C. of water insoluble natural gum material and a polycyclic phenolic poly ether containing from 2 to 3 beta-unsaturated aliphatic radicals having from 3 to 4 carbon atoms attached directly through oxygen to the polycycle.

6. A composition as in claim 5 in which the gum material is ester gum and the polyether is diallylether of diphenylolpropane.

7. A composition as in claim 5 in which the gum material is rosin and the polyether is diallylether of diphenylolpropane.

8. A composition as in claim 5 in which the gum material is a rosin alkyd and the polyether is diallyl ether of diphenylolpropane.

9. A composition containing a cellulose ester blended with the composition of claim 1.

10. A composition containing a synthetic resin modified by the composition of claim 1 the synthetic resin being different from the poly ether.

11. A composition containing a synthetic resinous polymer in combination with the composition of claim 1 the synthetic resin being different from the poly ether.

12. The method of making a composition adapted for use for coating and other purposes which comprises heating at between 200 and 300° C. until a product of low acid number is obtained, (a) material selected from the group consisting of non-conjugated drying oil fatty acids, polyhydric alcohol esters thereof, a natural water-insoluble gum, polyhydric alcohol esters of said gum, and alkyd resins modified by said gum, and mixtures thereof, and (b) a polycyclic phenolic polyether containing from 2 to 3 beta-unsaturated aliphatic radicals having from 3 to 4 carbon atoms attached directly through oxygen to the polycycle.

13. The method as in claim 12 which includes the step of incorporating the product of low acid number with a cellulose ester and a solvent.

14. The method as in claim 12 which includes the step of incorporating the product of low acid number with a synthetic resin the synthetic resin being different from the poly ether.

15. An article of manufacture including an insolubilized composition comprising a low acid number soluble heat reaction product at between 200° and 300° C. of (a) material selected from the group consisting of non-conjugated drying oil fatty acids, polyhydric alcohol esters thereof, a natural water-insoluble gum, polyhydric alcohol esters of said gum, and alkyd resins modified by said gum, and mixtures thereof, and (b) a polycyclic phenolic polyether containing from 2 to 3 beta-unsaturated aliphatic radicals having from 3 to 4 carbon atoms attached directly through oxygen to the polycycle.

References Cited in the file of this patent

UNITED STATES PATENTS 2,563,871 Rust et al. _____ Aug. 14, 1951